(12) United States Patent
Suzuki et al.

(10) Patent No.: US 9,789,874 B2
(45) Date of Patent: *Oct. 17, 2017

(54) VEHICLE TRAVEL CONTROL DEVICE FOR CONTROLLING A RUNNING MODE OF AN ENGINE

(71) Applicant: TOYOTA JIDOSHA KABUSHIKI KAISHA, Toyota-shi (JP)

(72) Inventors: Takeaki Suzuki, Susono (JP); Masaki Matsunaga, Odawara (JP); Yasunari Kido, Hadano (JP); Takayuki Kogure, Susono (JP); Yukari Okamura, Gotenba (JP); Rentaro Kuroki, Susono (JP); Takuya Hirai, Susono (JP); Masaki Mitsuyasu, Kawasaki (JP); Jonggap Kim, Hadano (JP); Akihiro Sato, Nagoya (JP); Yusuke Kinoshita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 138 days.

This patent is subject to a terminal disclaimer.

(21) Appl. No.: 14/439,593

(22) PCT Filed: Oct. 31, 2012

(86) PCT No.: PCT/JP2012/078232
§ 371 (c)(1),
(2) Date: Apr. 29, 2015

(87) PCT Pub. No.: WO2014/068724
PCT Pub. Date: May 8, 2014

(65) Prior Publication Data
US 2015/0298701 A1    Oct. 22, 2015

(51) Int. Cl.
*B60W 30/18*    (2012.01)
*B60W 10/06*    (2006.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC combination set(s) only.
See application file for complete search history.

(56) References Cited

U.S. PATENT DOCUMENTS 9,623,870 B2 * 4/2017 Kuroki ............ B60W 30/18109
2004/0143379 A1   7/2004 Borroni-Bird et al.
(Continued)

FOREIGN PATENT DOCUMENTS

JP    61-63447 U    4/1986
JP    2002-227885 A    8/2002
(Continued)

OTHER PUBLICATIONS

Office Action mailed on Jun. 6, 2016 in co-pending U.S. Appl. No. 14/416,774.
(Continued)

*Primary Examiner* — Thomas G Black
*Assistant Examiner* — Ana Thomas
(74) *Attorney, Agent, or Firm* — Oblon, McClelland, Maier & Neustadt, L.L.P.

(57) ABSTRACT

A running control device has an engine coupling running mode enabling an engine brake running mode performed by coupling an engine and wheels with an engine brake applied by driven rotation of the engine, and an inertia running mode performed with an engine brake force lower than that of the engine brake running mode. The running control device
(Continued)

includes a steering wheel steering angle as a condition of terminating the inertia running mode. The running control device performs a first inertia running mode with the rotation of the engine stopped and a second inertia running mode with the engine rotating. The first inertia running mode is terminated when the steering angle becomes equal to or greater than a predefined first determination value. The second inertia running mode is terminated when the steering angle becomes equal to or greater than a predefined second determination value larger than the first determination value.

5 Claims, 9 Drawing Sheets

(51) Int. Cl.
    *B60W 30/182*     (2012.01)
    *F16H 61/21*     (2006.01)
    *F02D 29/02*     (2006.01)
    *B60W 10/10*     (2012.01)
    *B60W 10/20*     (2006.01)
    *B60W 10/26*     (2006.01)
    *B60W 10/02*     (2006.01)
    *F16H 61/688*     (2006.01)

(52) U.S. Cl.
    CPC ............ *B60W 10/10* (2013.01); *B60W 10/20* (2013.01); *B60W 10/26* (2013.01); *B60W 30/182* (2013.01); *F02D 29/02* (2013.01); *F16H 61/21* (2013.01); *F16H 61/688* (2013.01); *B60W 2030/1809* (2013.01); *B60W 2510/244* (2013.01); *B60W 2540/18* (2013.01); *B60Y 2300/18083* (2013.01)

(56) References Cited

U.S. PATENT DOCUMENTS

| | | |
|---|---|---|
| 2005/0252701 A1 | 11/2005 | Shimizu |
| 2013/0173142 A1 | 7/2013 | Kato |
| 2014/0324305 A1 | 10/2014 | Larsson |
| 2015/0166066 A1* | 6/2015 | Suzuki ................ F02N 11/0833 477/174 |
| 2015/0266480 A1* | 9/2015 | Kuroki .................. F02D 41/045 477/174 |
| 2015/0274166 A1* | 10/2015 | Hirai ....................... F02D 29/02 701/67 |
| 2015/0274168 A1* | 10/2015 | Kuroki ................ B60W 10/184 701/70 |
| 2015/0291171 A1* | 10/2015 | Kuroki .................... F02D 41/12 701/70 |
| 2015/0298698 A1* | 10/2015 | Kim ...................... F16D 48/066 701/48 |
| 2015/0298701 A1 | 10/2015 | Suzuki et al. |
| 2015/0307103 A1* | 10/2015 | Kuroki .................... F16H 61/21 701/70 |

FOREIGN PATENT DOCUMENTS

| | | |
|---|---|---|
| JP | 2012-164277 A | 8/2012 |
| JP | 2014-84083 A | 5/2014 |
| WO | WO 2012/035601 A1 | 3/2012 |

OTHER PUBLICATIONS

International Search Report Issued Jan. 22, 2013 in PCT/JP12/078232 Filed Oct. 31, 2012.

Office Action mailed Feb. 3, 2016 in co-pending U.S. Appl. No. 14/416,774.

Notice of Allowability dated Sep. 27, 2016 in U.S. Appl. No. 14/416,774.

* cited by examiner

FIG.2

| RUNNING MODE | ENGINE 12 | CLUCH C1 | ENGINE BRAKE FORCE | FUEL CONSUMPTION | BATTERY CHARGING |
|---|---|---|---|---|---|
| NORMAL RUNNING | DRIVING; DRIVEN | ENGAGED | LARGE | — | O |
| FREE-RUN INERTIA RUNNING | F/C; ROTATION STOP | RELEASED | SMALL | ◎ | × |
| NEUTRAL INERTIA RUNNING | IDLE ROTATION | RELEASED | SMALL | O | O |

| RUNNING MODE | ENGINE 12 | CLUCH C1 | ENGINE BRAKE FORCE | FUEL CONSUMPTION | BATTERY CHARGING |
|---|---|---|---|---|---|
| NORMAL RUNNING | DRIVING; DRIVEN | ENGAGED | LARGE | — | ○ |
| FREE-RUN INERTIA RUNNING | F/C; ROTATION STOP | RELEASED | SMALL | ◎ | × |
| CYLINDER RESTING INERTIA RUNNING | F/C; DRIVEN ROTATION | ENGAGED | MEDIUM | ○ | ○ |

VEHICLE TRAVEL CONTROL DEVICE FOR CONTROLLING A RUNNING MODE OF AN ENGINE

TECHNICAL FIELD

The present invention relates to a running control device of a vehicle and particularly to a technique of further improving fuel consumption while suppressing battery degradation in a vehicle capable of an inertia running mode performed with an engine brake force made lower than that of an engine brake running mode.

BACKGROUND ART

With regard to an engine brake running mode performed with engine brake applied by driven rotation of an engine while the engine is coupled to wheels, an inertia running mode performed with an engine brake force made lower than that of the engine brake running mode is conceived for extending a running distance and improving fuel consumption. A device described in Patent Document 1 is an example thereof and, two types of control modes are proposed as (a) a first inertia running mode performed with rotation of the engine stopped and (b) a second inertia running mode performed with the engine kept rotating. Specifically, the first inertia running mode is a free-run inertia running mode in which a clutch is released to separate the engine from the wheels while fuel supply to the engine is stopped to stop rotation, and the second inertia running mode is a neutral inertia running mode performed by supplying fuel to allow the engine to operate (perform self-sustaining rotation) while a clutch is released to separate the engine from the wheels. The inertia running mode is performed in either mode without particular distinction under certain conditions.

PRIOR ART DOCUMENT

Patent Document

Patent Document 1: Japanese Laid-Open Patent Publication No. 2002-227885

SUMMARY OF THE INVENTION

Problem to be Solved by the Invention

In the Patent Document 1, when a steering angle of a steering wheel becomes equal to or greater than a predetermined angle, the control mode of the inertia running mode is canceled without distinction between the two types of the inertia running modes. In particular, when steering is performed at a large angle for changing a lane or avoiding danger, an engine is connected to wheels to ensure driving performance.

However, in a vehicle equipped with an electric power steering system electrically assisting a steering operation of a driver, battery power consumption is different between the first inertia running mode and the second inertia running mode associated with different engine states. In particular, although a vehicle generally includes an alternator generating electricity from the rotation of the engine, the battery cannot be charged in the first inertia running mode in which the rotation of the engine is stopped and, therefore, an electric storage remaining amount of the battery is reduced by the operation of the electric power steering system associated with a steering operation. In contrast, since the battery is sequentially charged in the second inertia running mode in which the engine is rotated, the electric storage remaining amount of the battery is ensured regardless of the operation of the electric power steering system. However, since the engine is rotating and a loss of the engine occurs, fuel consumption deteriorates as compared to the first inertia running mode. Since degradation is facilitated in the battery by a large change in the electric storage remaining amount because of the characteristics thereof, it is desirable to suppress a change in the electric storage remaining amount of the battery as far as possible.

From the above, the first inertia running mode is preferable in terms of improvement in fuel consumption since the inertia running mode is performed with the rotation of the engine stopped, while the second inertia running mode is preferable in terms of suppression of battery power consumption since the engine is rotating. Thus, although the first inertia running mode and the second inertia running mode have different characteristics in terms of the fuel consumption and the battery power consumption, these types of inertia running modes are uniformly terminated at a constant steering angle in Patent Document 1 and, therefore, the device has room for improvement in battery degradation and fuel consumption. Since no consideration is given to whether a state of the engine is set to "rotation" (the second inertia running mode) or "stop" (the first inertia running mode) in terms of battery power consumption during the inertia running mode in Patent Document 1, the condition of terminating the inertia running mode is incomplete in terms of fuel consumption as well as power consumption.

The present invention was conceived in view of the situations and it is therefore an object of the present invention to further improve fuel consumption while suppressing battery degradation in a vehicle capable of an inertia running mode performed with an engine brake force made lower than that of an engine brake running mode.

Means for Solving the Problem

To achieve the object, the first aspect of the invention provides (a) a running control device of a vehicle having an engine, an alternator generating electricity from rotation of the engine, a battery storing electric power generated by the alternator, a steering wheel operated by a driver, and an electric power steering system assisting a steering operation of the driver by using electric power of the battery, (b) the running control device of a vehicle being configured to execute an engine coupling running mode enabling an engine brake running mode performed by coupling the engine and wheels with an engine brake applied by driven rotation of the engine, and an inertia running mode performed with an engine brake force made lower than that of the engine brake running mode, the running control device of a vehicle including a steering angle of the steering wheel as a condition of terminating the inertia running mode, (c) the running control device of a vehicle performing a first inertia running mode performed with the rotation of the engine stopped and a second inertia running mode performed with the engine kept rotating as the inertia running in accordance with predefined respective execution conditions, (d) the first inertia running mode being terminated when the steering angle becomes equal to or greater than a predefined first determination value α while the first inertia running mode is performed, (e) the second inertia running mode being terminated when the steering angle becomes equal to or greater than a predefined second determination value β larger than the first determination value α while the second inertia running mode is performed.

The second aspect of the invention provides the running control device of a vehicle recited in the first aspect of the invention, wherein (a) if the steering angle becomes equal to or greater than the first determination value α while the first inertia running mode is performed, a shift to the second inertia running mode is made, and wherein (b) if the steering angle becomes equal to or greater than the second determination value β while the second inertia running mode is performed, a return to the engine coupling running mode is made.

The third aspect of the invention provides the running control device of a vehicle recited in the first aspect of the invention, wherein if the steering angle becomes equal to or greater than the first determination value α while the first inertia running mode is performed, a return to the engine coupling running mode is made.

The fourth aspect of the invention provides the running control device of a vehicle recited in any one of the first to third aspects of the invention, wherein (a) the first inertia running mode is a free-run inertia running mode in which the engine is separated from the wheels with fuel supply to the engine stopped to stop rotation, and wherein (b) the second inertia running mode is a neutral inertia running mode in which fuel is supplied to allow the engine to operate while the engine is separated from the wheels.

In the neutral inertia running mode, although the engine is operated by supplying fuel and therefore, this deteriorates the fuel consumption as compared to the free-run inertia running mode, since the engine is disconnected from the wheels, the engine brake force is substantially zero, the distance of the inertia running mode becomes longer and a frequency of reacceleration is reduced and thus, overall fuel consumption can be improved as compared to the engine brake running mode.

The fifth aspect of the invention provides the running control device of a vehicle recited in any one of the first to third aspects of the invention, wherein (a) the first inertia running mode is a free-run inertia running mode in which the engine is separated from the wheels with fuel supply to the engine stopped to stop rotation, and wherein (b) the second inertia running mode is a cylinder resting inertia running mode in which fuel supply to the engine is stopped with the engine kept coupled to the wheels while operation of at least one of a piston and intake/exhaust valves is stopped in some or all of multiple cylinders of the engine.

In the cylinder resting inertia running mode, although the crankshaft is driven to rotate depending on the vehicle speed etc., the engine brake force is reduced by only a portion without a loss (rotation resistance) due to a pumping action when the piston is stopped. Also when the intake/exhaust valves are stopped in the closed valve state or the opened valve state, a loss due to a pumping action becomes smaller as compared to the case of opening/closing in synchronization with the crankshaft, and the engine brake force is reduced.

Effects of the Invention

In running control device as described above, both the first inertia running mode and the second inertia running mode are performed as the inertia running mode, and the first inertia running mode performed with the rotation of the engine stopped is terminated when the steering angle becomes equal to or greater than the relatively small first determination value α. Since electricity cannot be generated by the alternator in the first inertia running mode, the electric storage remaining amount of the battery is reduced in association with the operation of the electric power steering system when a driver performs a steering operation; however, the first inertia running mode is terminated at a relatively small steering angle and, therefore, a reduction amount of the electric storage remaining amount is made small, which suppresses the degradation of the battery due to a change in the electric storage remaining amount. Since the first inertia running mode is performed and the rotation of the engine is stopped until the steering angle reaches the first determination value α, an excellent fuel consumption improving performance is acquired.

On the other hand, since the second inertia running mode performed with the engine kept rotating is performed until the steering angle reaches the relatively large second determination value β and the battery is charged by electricity generated by the alternator in the second inertia running mode, a small reduction in the electric storage remaining amount of the battery is associated with the operation of the electric power steering system and the battery performance is favorably maintained. Since the second inertia running mode is performed until the steering angle reaches the relatively large second determination value β, excellent fuel consumption is acquired as compared to the engine brake running mode.

In particular, if the upper limit values (α, β) of the steering angle for performing the first inertia running mode and the second inertia running mode are uniformly made larger to put importance on fuel consumption, the operation of the electric power steering system significantly reduces the electric storage remaining amount of the battery and facilitates degradation in the first inertia running mode since the rotation of the engine is stopped. Contrarily, if the upper limit values (α, β) of the steering angle for performing the first inertia running mode and the second inertia running mode are uniformly made smaller to put importance on maintenance of battery performance, the battery is charged with electricity generated by the alternator and the electric storage remaining amount is properly maintained even at the time of operation of the electric power steering system in the second inertia running mode since the engine is rotated; however, an opportunity of inertia running mode is eliminated and the fuel efficiency improving performance is not sufficiently acquired. With regard to this problem, in the present invention of this application, Since a difference is set between the upper limits of the steering angle for terminating the first inertia running mode and the second inertia running mode based on whether the battery can be charged in consideration of the power consumption due to the operation of the electric power steering system, the fuel consumption can further be improved by expanding the range of the steering angle for performing the inertia running mode while suppressing the degradation of the battery regardless of the power consumption due to the operation of the electric power steering system.

The second aspect of the invention is the case that if the steering angle becomes equal to or greater than the first determination value α while the first inertia running mode is performed, a shift to the second inertia running mode is made, and if the steering angle becomes equal to or greater than the second determination value β while the second inertia running mode is performed, a return to the engine coupling running mode is made, and the battery is charged by the electric generation of the alternator associated with the rotation of the engine when the steering angle is equal to or greater than the first determination value α. Therefore, the degradation of the battery due to reduction in the electric storage remaining amount is suppressed regardless of the power consumption associated with the operation of the electric power steering system and the fuel consumption is improved by performing the inertia running mode until the steering angle becomes equal to or greater than the second determination value β.

The third aspect of the invention is the case that return to the engine coupling running mode is made when the steering angle becomes equal to or greater than the first determination value α during the first inertia running mode, and the battery is charged by the electric generation of the alternator associated with the rotation of the engine when the steering angle becomes equal to or greater than the first determination value α. Therefore, the degradation of the battery due to reduction in the electric storage remaining amount is suppressed regardless of the power consumption associated with the operation of the electric power steering system.

The fourth aspect of the invention is the case that the free-run inertia running mode is performed as the first inertia running mode and the neutral inertia running mode is performed as the second inertia running mode, while the fifth aspect of the invention is the case that the free-run inertia running mode is performed as the first inertia running mode and the cylinder resting inertia running mode is performed as the second inertia running mode. The engine brake force is made smaller as compared to the engine brake running mode in both cases and a running distance of the inertia running mode is extended and the fuel consumption can be improved.

MODE FOR CARRYING OUT THE INVENTION

Although the present invention is applied to a vehicle including at least an engine as a drive force source and is preferably applied to an engine drive vehicle, the present invention is also applicable to a hybrid vehicle including an electric motor or a motor generator as a drive force source in addition to the engine. The engine may be an internal combustion engine generating power from combustion of fuel. An alternator generates electricity from the rotation of the engine to charge a battery and includes, for example, a diode for rectification and a generator, or may be made up of a motor generator also usable as an electric motor. An electric power steering system is configured to assist a steering operation with an electric motor, for example, or may assist the steering operation with an oil pressure generated by an electric oil pump, and means those assisting the steering operation based on the electric power of the battery. With regard to a steering angle, for example, if an electric motor provides assistance, the steering angle can be detected from an assist torque thereof and, therefore, the steering angle may be not only an actual steering angle of a steering wheel itself but also an angle obtained from a parameter varying in accordance with the steering angle.

A connecting/disconnecting device is disposed between the engine and wheels to connect and disconnect therebetween such that the engine can be separated from the wheels. Although the connecting/disconnecting device is preferably implemented by using a hydraulic friction type clutch or brake, connecting/disconnecting devices of various types can be employed, including electrically controlling a reaction force to connect and disconnect the power transmission. An automatic transmission including pluralities of clutches and brakes and capable of being neutral is also usable.

In the engine brake running mode during the engine coupling running mode, all the cylinders of the engine are driven to rotate so as to generate an engine brake force from a rotation resistance such as a pumping loss and a friction torque, and the engine may be in a fuel cut (F/C) state in which fuel supply is stopped or may be in an operating state such as an idling state in which a predetermined amount of fuel is supplied. Even in the case of the idling state, the engine brake force is generated from the driven rotation at a rotation speed corresponding to a vehicle speed etc.

The first inertia running mode is, for example, a free-nm inertia running mode in which the engine is separated from the wheels by the connecting/disconnecting device while the fuel supply to the engine is stopped to stop the engine rotation. The second inertia running mode is, for example, a neutral inertia running mode in which fuel is supplied to operate (perform self-sustaining rotation) the engine while the engine is separated from the wheels by the connecting/disconnecting device, or a cylinder resting inertia running mode in which the fuel supply to the engine is stopped with the engine coupled to the wheels by the connecting/disconnecting device while operation of at least one of a piston and intake/exhaust valves is stopped in some or all of multiple cylinders. In the neutral inertia running mode, the engine is desirably operated in the idle state with substantially the minimum supply amount of fuel, for example; however, the engine may be operated in a state other than the idle state. The pistons and the intake/exhaust valves can mechanically be stopped in the cylinder resting inertia running mode by disconnecting a clutch mechanism disposed between a crankshaft and the respective pistons and the intake/exhaust valves, for example. With regard to the intake/exhaust valves, for example, if intake/exhaust valves of electromagnetic type etc. are used that can be controlled to open/close independently of the rotation of the crankshaft, the operation thereof may be stopped. Although appropriate stop positions of the intake/exhaust valves are positions where all the intake/exhaust valves are in a closed valve state, the stop positions are defined as needed, including stopping at positions where all the valves are in an opened valve state. Even when both the neutral inertia running mode and the cylinder resting inertia running mode are performed as the second inertia running mode in individual cases, the present invention is applicable. In this case, a common valve or different respective values may be set as the second determination values $\beta$.

The present invention relates to termination determination of the first inertia running mode and the second inertia running mode and the execution conditions (start conditions) of these types of the inertia running modes are appropriately defined. For example, the conditions are defined such that either one type of the inertia running mode is selected and started if an output request amount such as an accelerator operation amount of zero (accelerator-off) and a brake request amount such as a brake operation force of zero (brake-off) are continued for a certain time period or longer.

The individual cases of starting the execution of the first inertia running mode and the second inertia running mode are defined, for example, such that the execution of the first inertia running mode is started when the steering angle is less than a first determination value $\alpha$ while the execution of the second inertia running mode is started when the steering angle is equal to or greater than the first determination value $\alpha$ and less than a second determination value $\beta$. Since electricity can be generated by the alternator from the rotation of the engine in the second inertia running mode, the first inertia running mode may be limited depending on the necessity of electric energy such as when the electric storage remaining amount of the battery is equal to or less than a predetermined amount so as to perform the second inertia running mode even at the steering angle less than the first determination value $\alpha$, and the execution start conditions of the inertia running mode are appropriately defined based on a vehicle state, a running state, etc.

The present invention is configured at least in terms of the steering angle such that if the execution of the first inertia running mode or the second inertia running mode is started in accordance with the execution conditions as described above, the first inertia running mode is terminated at a stage of the steering angle smaller than that of the second inertia running mode. Another control termination condition may be defined. If the steering angle becomes equal to or greater than the first determination value $\alpha$ while the first inertia running mode is performed, the first inertia running mode is terminated for shifting to the second inertia running mode or returning to the engine coupling running mode, for example; however, a shift to another running mode with the engine rotated can also be made. If the steering angle becomes equal to or greater than the second determination value $\beta$ while the second inertia running mode is performed, the second inertia running mode is terminated for returning to the engine coupling running mode, for example; however, a shift to another running mode with the engine rotated can also be made.

Although the first determination value $\alpha$ and the second determination value $\beta$ may be defined as respective constant values, or can variably be set depending on a vehicle state such as the electric storage remaining amount of the battery and a running state, for example. If the first determination value $\alpha$ is set depending on the electric storage remaining amount of the battery and, for example, a smaller value is defined in the case of a small electric storage remaining amount as compared to a large electric storage remaining amount, the first inertia running mode is terminated at relatively small steering angle and the electric generation by the alternator is restarted early to charge the battery. As a result, even when the electric storage remaining amount of the battery is small, the battery degradation due to reduction in the electric storage remaining amount can be suppressed while enjoying the fuel consumption improving performance from the execution of the first inertia running mode. The variable setting of the first determination value $\alpha$ and the second determination value $\beta$ may vary the determination values $\alpha$ and $\beta$ continuously or in stages including two stages, and is defined in advance from a data map, a computing equation, etc.

EXAMPLE

An example of the present invention will now be described in detail with reference to the drawings.

Figure 1:
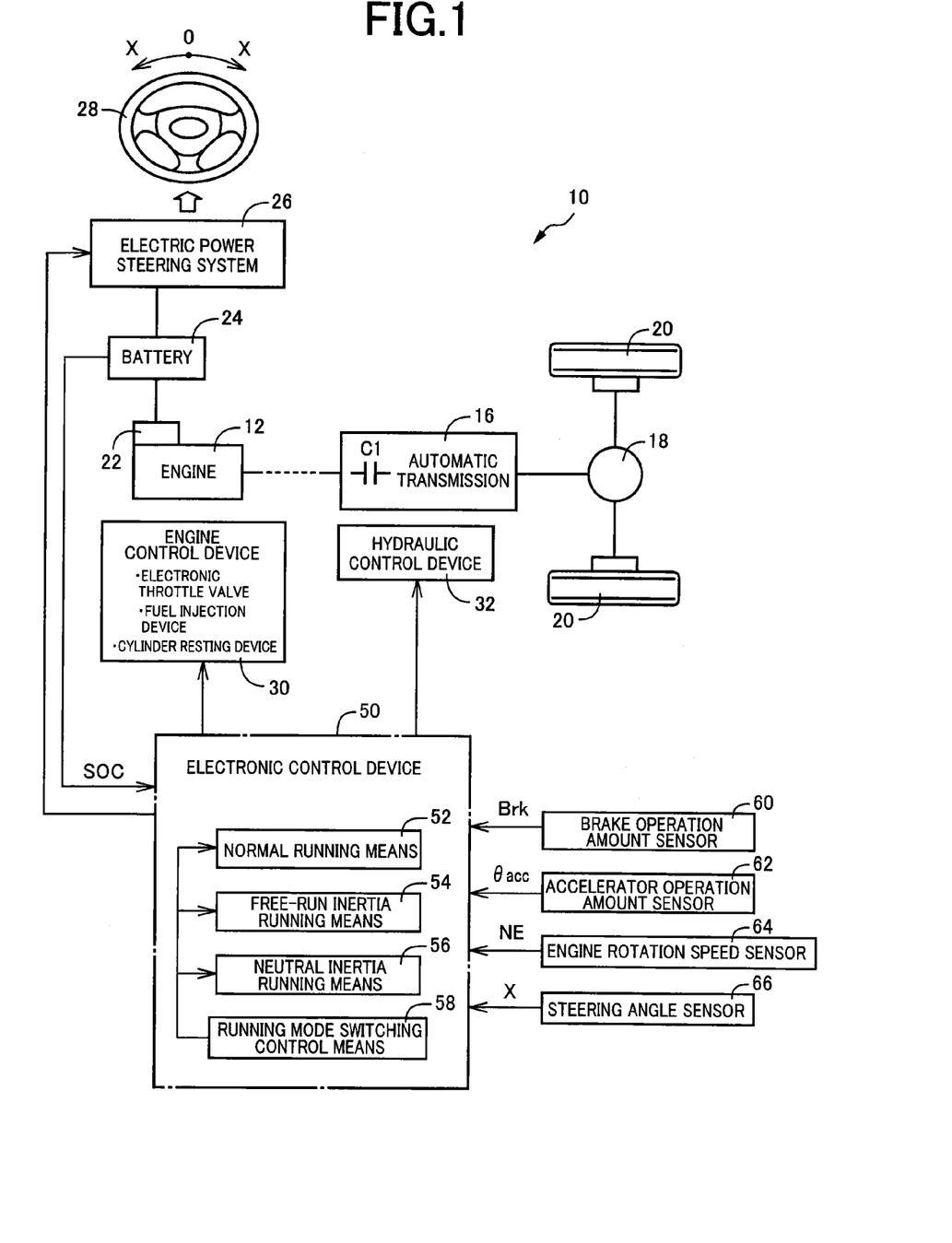
FIG. 1 is a schematic configuration diagram including a schematic of a vehicle drive device to which the present invention is preferably applied along with a main portion of a control system.

FIG. 1 is a schematic configuration diagram including a schematic of a vehicle drive device 10 to which the present invention is preferably applied along with a main portion of a control system. The vehicle drive device 10 includes as a drive force source an engine 12 that is an internal combustion engine such as a gasoline engine and a diesel engine generating power from combustion of fuel, and the output of the engine 12 is transmitted from an automatic transmission 16 via a differential gear device 18 to left and right wheels 20. A damper device and a power transmission device such as a torque converter are disposed between the engine 12 and the automatic transmission 16, and a motor generator acting as a drive force source can also be disposed therebetween.

An alternator 22 is coupled via a belt etc. to the engine 12 and is rotated along with the rotation of the engine 12 to generate electricity, thereby charging the battery 24. The vehicle drive device 10 of this example includes an electric power steering system 26 electrically assisting a steering operation of a driver by utilizing the electric power of the battery 24 and reduces an operation force required for the driver to perform a rotating operation (steering) of a steering wheel 28. The electric power steering system 26 used is, for example, a system assisting the steering operation with a rotation torque of an electric motor.

The engine 12 includes an engine control device 30 having various pieces of equipment necessary for output control of the engine 12, such as an electronic throttle valve and a fuel injection device, and a cylinder resting device. The electronic throttle valve and the fuel injection device control an intake air amount and a fuel supply amount, respectively, and are basically controlled depending on an operation amount of an accelerator pedal (an accelerator operation amount) $\theta acc$ that is an output request amount of a driver. The fuel injection device can stop the fuel supply (perform a fuel cut F/C) at the time of acceleration-off when the accelerator operation amount $\theta acc$ is zero even during running of the vehicle. The cylinder resting device can mechanically separate intake/exhaust valves of some or all of multiple cylinders, for example, eight cylinders, from a crankshaft by a clutch mechanism etc. to stop the valves and, for example, the intake/exhaust valves are stopped at positions where all the valves are in a closed valve state. As a result, since a pumping loss is reduced when the engine 12 is driven to rotate in the fuel cut state, an engine brake force is reduced and a running distance of inertia running mode can be extended. The alternator 22 is coupled to the crankshaft and is rotated along with the rotation of the crankshaft to generate electricity regardless of the resting of the cylinders.

The automatic transmission 16 is a stepped automatic transmission of a planetary gear type etc., having a plurality of gear stages with different gear ratios e established depending on engaged/released states of a plurality of hydraulic friction engagement devices (clutches and brakes) and is subjected to shift control by electromagnetic hydraulic control valves, switching valves, etc. disposed in a hydraulic control device 32. A clutch C1 acts as an input clutch of the automatic transmission 16 and is also subjected to engagement/release control by the hydraulic control device 32. The clutch C1 corresponds to a connecting/disconnecting device connecting and disconnecting the engine 12 and the wheels 20. The automatic transmission 16 may be implemented by using a continuously variable transmission of a belt type etc., instead of a stepped transmission.

The vehicle drive device 10 configured as described above includes an electronic control device 50. The electronic control device 50 includes a so-called microcomputer having a CPU, a ROM, a RAM, an I/O interface, etc., to execute signal processes in accordance with a program stored in advance in the ROM, while utilizing a temporary storage function of the RAM. The electronic control device 50 is supplied with a signal indicative of an operation force of a brake pedal (brake operation force) Brk from a brake operation amount sensor 60 and is supplied with a signal indicative of an operation amount of a accelerator pedal (accelerator operation amount) θacc from an accelerator operation amount sensor 62. The electronic control device 50 is also supplied with a signal indicative of a rotation speed (engine rotation speed) NE of the engine 12 from an engine rotation speed sensor 64 and a signal indicative of a steering angle X of the steering wheel 28 from a steering angle sensor 66. The electronic control device 50 is also supplied with a signal indicative of an electric storage remaining amount SOC of the battery 24. Other various pieces of information necessary for various types of control are also supplied. The steering angle sensor 66 is an angle sensor etc., and detects the steering angle X as a positive (+) angle regardless of whether right rotation or left rotation by assuming that the steering angle X is zero when the vehicle runs straight. The electric storage remaining amount SOC is acquired by reading a voltage value of the battery 24, for example, or may be calculated from charging/discharging amounts. The brake operation force Brk corresponds to a driver's brake request amount and the accelerator operation amount θacc corresponds to a driver's output request amount.

The electronic control device 50 functionally includes a normal running means 52, a free-run inertia running means 54, a neutral inertia running means 56, and a running mode switching control means 58. The normal running means 52, the free-run inertia running means 54, and the neutral inertia running means 56 are for the purpose of performing three respective running modes depicted in FIG. 2 and the normal running means 52 performs a normal running mode (hereinafter also referred as "normal running"). The normal running mode is performed in a power transmission state in which the clutch C1 is engaged to connect the engine 12 and the wheels 20 via the automatic transmission 16, and can perform an engine drive running mode performed by operating the engine 12 in accordance with the accelerator operation amount θacc as well as engine brake running mode in which the engine 12 is driven to rotate in accordance with the vehicle speed V in an idle state or in a fuel cut (F/C) state in which fuel supply is stopped. In the engine brake running mode, a relatively large engine brake is generated from a pumping loss and a friction torque by driven rotation of all the cylinders of the engine 12. In this normal running mode, the alternator 22 is rotated in accordance with the rotation of the engine 12 regardless of whether the engine brake running mode or not and the battery 24 is charged. The normal running mode corresponds to engine coupling running mode.

Figure 2:
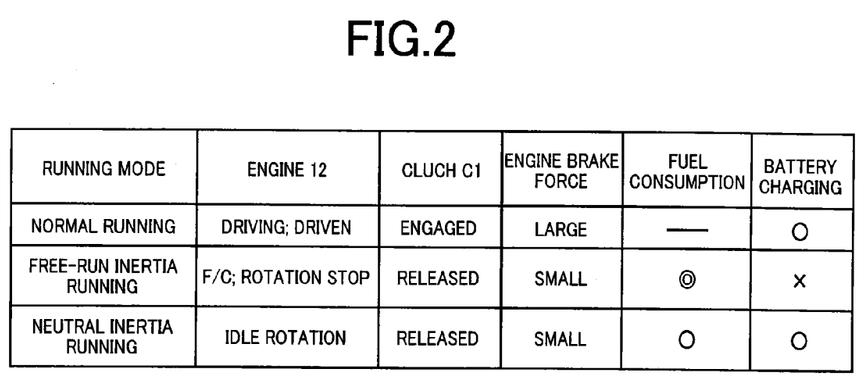
FIG. 2 is a diagram for explaining three kinds of running modes performed by the vehicle drive device of FIG. 1.

The free-run inertia running means 54 performs a free-run inertia running mode (hereinafter also referred as "free-run inertia running") in accordance with a predefined execution condition such as during accelerator-off. The free-run inertia running mode is performed by releasing the clutch C1 to separate (disconnect) the engine 12 from the wheels 20 while a fuel cut F/C is performed to stop the fuel supply to the engine 12 so that the rotation of the engine 12 is stopped. In this case, since the engine brake force becomes smaller than that of the engine brake running mode and the release of the clutch C1 results in the engine brake force of substantially zero, a reduction in running resistance extends the running distance of the inertia running mode, fuel supply to the engine 12 is stopped, and therefore fuel consumption can be significantly improved. Since the rotation of the engine 12 is stopped, the rotation of the alternator 22 is stopped and the battery 24 becomes unable to be charged. In this example, the free-run inertia running mode is performed as a first inertia running mode.

The neutral inertia running means 56 performs a neutral inertia running mode (hereinafter also referred as "neutral inertia running") in accordance with a predefined execution condition such as during accelerator-off. The neutral inertia running mode is performed by releasing the clutch C1 to separate the engine 12 from the wheels 20 while fuel is supplied to allow the engine 12 to rotate in the idling state (perform self-sustaining rotation). Also in this case, since the engine brake force becomes smaller than that of the engine brake running mode and the release of the clutch C1 results in the engine brake force of substantially zero, a reduction in running resistance extends the running distance of the inertia running mode, and fuel consumption can be improved. Although fuel is consumed by operating the engine 12 in the idling state, since the distance of the inertia running mode becomes longer as compared to the normal engine brake running mode with the engine 12 connected to the wheels 20, a frequency of reacceleration is reduced and overall fuel consumption is improved. Since the engine 12 is rotated in the idle state, the alternator 22 is rotated in accordance with the engine rotation and the battery 24 is charged. In this example, the neutral inertia running mode is performed as a second inertia running mode.

Figure 3:
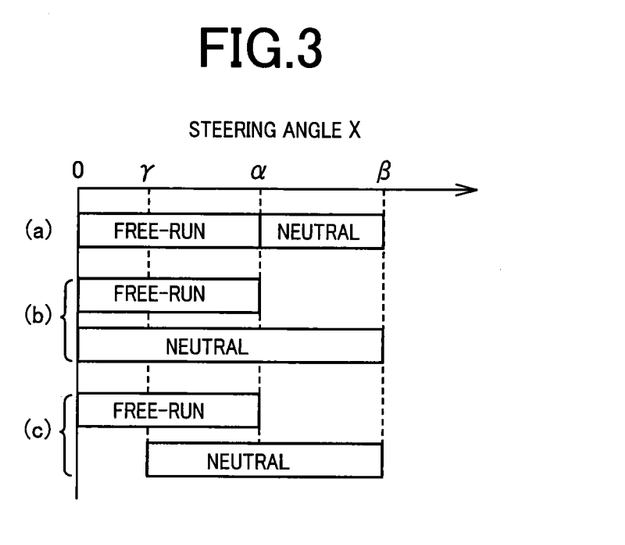
FIG. 3 is a diagram for explaining a difference between execution ranges in terms of steering angle X of a free-run inertia running mode and a neutral inertia running mode performed by the vehicle drive device of FIG. 1.

The running mode switching control means 58 switches three running modes of the normal running mode, the free-run inertia running mode, and the neutral inertia running mode and switches the running modes in terms of the steering angle X in accordance with an individual case (an execution condition) indicated by any one of (a) to (c) of FIG. 3, for example. The individual cases may be defined such that at least the steering angle X is involved, and the execution may be started or terminated in accordance with a condition other than the steering angle X.

In FIG. 3, (a) indicates that the free-run inertia running mode is performed when the steering angle X is less than the first determination value α, including during non-steering at the steering angle X=0, that the neutral inertia running mode is performed when the steering angle X is equal to or greater than the first determination value α and less than the second determination value β, and that the normal running mode is performed when the steering angle X is equal to or greater than the second determination value β. The first determination value α is an upper limit value for performing the free-run inertia running mode and, when the steering angle X becomes equal to or greater than the first determination value α, the free-run inertia running mode is terminated. The second determination value β is an upper limit value for performing the neutral inertia running mode and, when the steering angle X becomes equal to or greater than the second determination value β, the neutral inertia running mode is terminated. The first determination value α is smaller than the second determination value β and, if the steering wheel 28 is operated rotationally, the free-run inertia running mode is terminated at a smaller steering angle X as compared to the neutral inertia running mode.

In the case of (b), the free-run inertia running mode is performed when the steering angle X is less than the first determination value α, including during non-steering at the steering angle X=0, as is the case with (a); however, a difference is that the neutral inertia running mode is performed when the steering angle X is less than the second determination value β, including during non-steering at the steering angle X=0. In this case, when the steering angle X is less than the first determination value α, the free-run inertia running mode and the neutral inertia running mode are performed in accordance with predefined individual cases. For example, if a brake booster is included that amplifies a brake force by using a negative pressure generated form the engine rotation, the amplification effect on the brake force is reduced in the free-run inertia running mode with the engine rotation stopped and, therefore, for example, if a brake operation is more likely to be performed as in the case of a relatively steep down-grade or a high vehicle speed, the free-run inertia running mode is limited so that the neutral inertia running mode is performed even when the steering angle X is less than the first determination value α, or various other execution conditions can be set based on a running state and a vehicle state. In this case, if the steering angle X becomes equal to or greater than the first determination value α while the free-run inertia running mode is being performed at the steering angle X less than the first determination value α, a switchover to the neutral inertia running mode is desirably performed, or alternatively, a shift to the engine brake running mode may directly be made.

Although (c) is substantially the same as (b) described above, a third determination value γ is set as an execution lower limit value for the neutral inertia running mode separately from the steering angle X=0 in this case and is set to a value smaller than the first determination value α. In this case, when the steering angle X is less than the third determination value γ, the free-run inertia running mode is performed and, if the steering angle X becomes equal to or greater than the third determination value γ, a switchover to the neutral inertia running mode may be performed as needed, or alternatively, if the steering angle X becomes equal to or greater than the third determination value γ, the neutral inertia running mode may be performed without performing the free-run inertia running mode.

Figure 4:
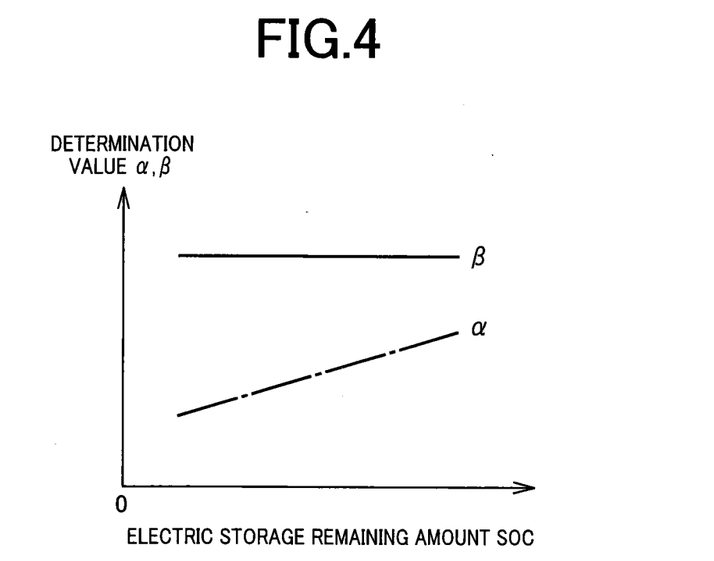
FIG. 4 is a diagram for indicating an example of a data map when the first determination value α of FIG. 3 is set depending on electric storage remaining amount SOC.

Although the determination values α and β may be defined as constant values in advance, the first determination value α may variably be set by using the electric storage remaining amount SOC of the battery 24 as a parameter as depicted in FIG. 4, for example. In particular, since the battery 24 cannot be charged in the free-run inertia running mode, the first determination value α is made smaller in the case of a small electric storage remaining amount SOC as compared to the case of a large electric storage remaining amount SOC, so as to make a shift from the free-run inertia running mode to the neutral inertia running mode at a smaller steering angle X so that the battery 24 can be charged by the electric generation of the alternator 22. The first determination value α as described above is defined in advance from a data map, a computing equation, etc. Although the second determination value β is constant regardless of the electric storage remaining amount SOC in FIG. 4, the second determination value β may also variably be set depending on the electric storage remaining amount SOC.

Figure 5:
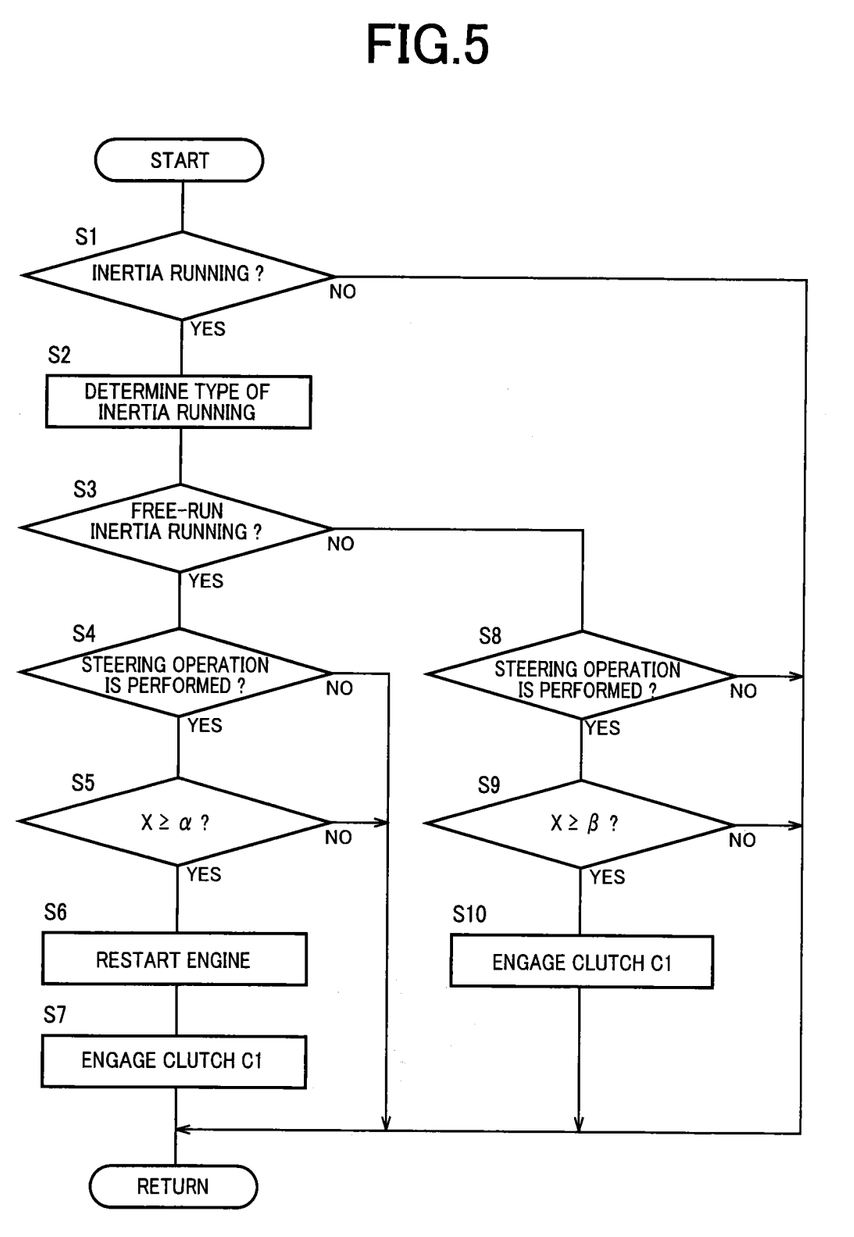
FIG. 5 is a flow chart for explaining an operation of a termination determination of the inertia running mode performed by the electronic control device of FIG. 1.

FIG. 5 is a flowchart of an operation when the running mode switching control means 58 makes a termination determination of the free-run inertia running mode and the neutral inertia running mode for switching to the normal running mode. This flowchart represents the case of returning to the normal running mode when the steering angle X becomes equal to or greater than the first determination value α during execution of the free-run inertia running mode and returning to the normal running mode when the steering angle X becomes equal to or greater than the second determination value β during execution of the neutral inertia running mode, and is an example of (b) and (c) of FIG. 3.

At step S1 of FIG. 5, it is determined whether any of the free-run inertia running mode and the neutral inertia running mode is being performed and, if any inertia running mode is being performed, a type of the inertia running mode is determined at step S2. The determinations on whether the inertia running mode is being performed and the type of the inertia running mode may be made from the state of the engine 12 and the state of the clutch C1 depicted in FIG. 2, for example, or may be made from a flag etc. indicative of a type of the inertia running mode. At step S3, the individual case is determined based on whether the inertia running mode is the free-run inertia running mode and, the process from step S4 is performed in the case of the free-run inertia running mode, or the process from step S8 is executed in the case of the neutral inertia running mode.

At step S4, it is determined whether a steering operation is performed, based on the steering angle X etc., and if a steering operation is not performed, the process is terminated to repeat from step S1, or if a steering operation is performed, step S5 is executed. At step S5, it is determined whether the steering angle X is equal to or greater than the first determination value α and, if X<α is satisfied, the process is terminated, or if X≥α is satisfied, the engine 12 is restarted at step S6 and the clutch C1 is engaged at step S7 to terminate the free-run inertia running mode and return to the normal running mode.

If the determination of step S3 is NO (negative), i.e., if the neutral inertia running mode is being performed, it is determined at step S8 whether a steering operation is performed, based on the steering angle X etc. If a steering operation is not performed, the process is terminated to repeat from step S1, or if a steering operation is performed, step S9 is executed. At step S9, it is determined whether the steering angle X is equal to or greater than the second determination value β and, if X<β is satisfied, the process is terminated, or if X≥β is satisfied, the clutch C1 is engaged at step S10 to terminate the neutral inertia running mode and return to the normal running mode.

Figure 6:
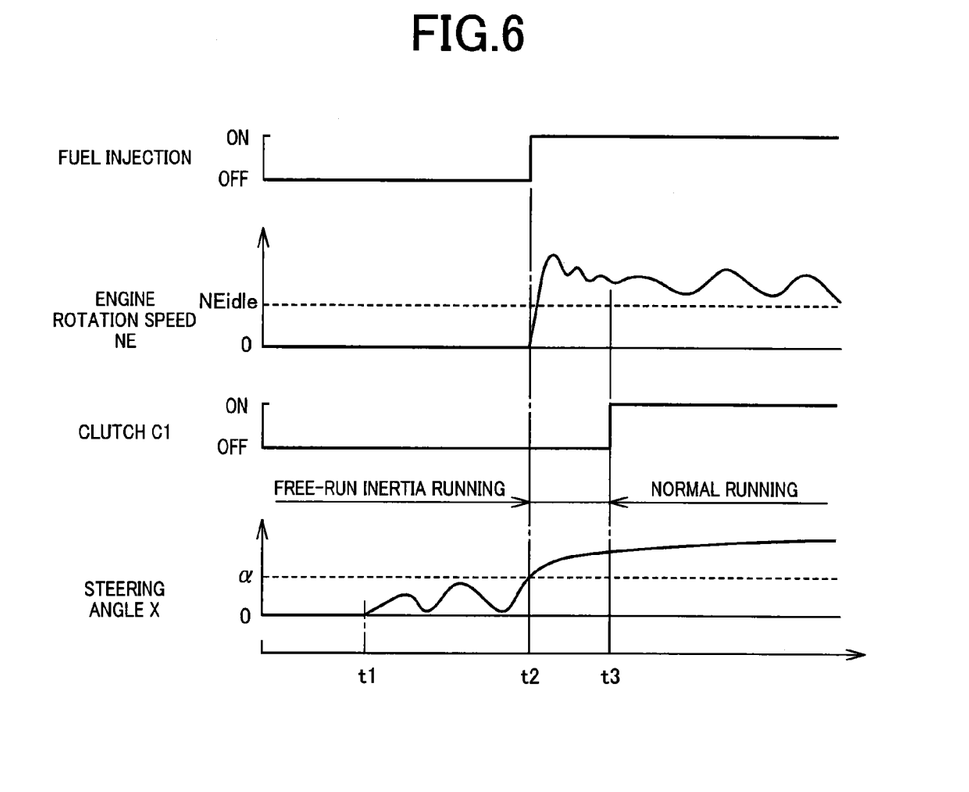
FIG. 6 is an example of a time chart of changes in operation states of the portions when the free-run inertia running mode is returned to the normal running mode in accordance with the flowchart of FIG. 5.

FIG. 6 is an example of a time chart of changes in operation states of the portions when steps S3 to S7 described above are executed for returning from the free-run inertia running mode to the normal running mode and the changes may occur in the case of (b) or (c) of FIG. 3. Time t1 of FIG. 6 is the time when the operation of the steering wheel 28 is started during execution of the free-run inertia running mode, and time t2 is the time when the steering angle X becomes equal to or greater than the first determination value α and the determination of step S5 becomes YES (affirmative) so that the fuel injection is resumed to restart the engine 12. Subsequently, when the engine rotation speed NE is raised, (time t3) the clutch C1 is engaged for returning to the normal running mode. In this case, the engine 12 is in the idle state and the engine brake running mode is performed with the engine driven to rotate depending on the vehicle speed V and the gear ratio e of the automatic transmission 16.

Figure 7:
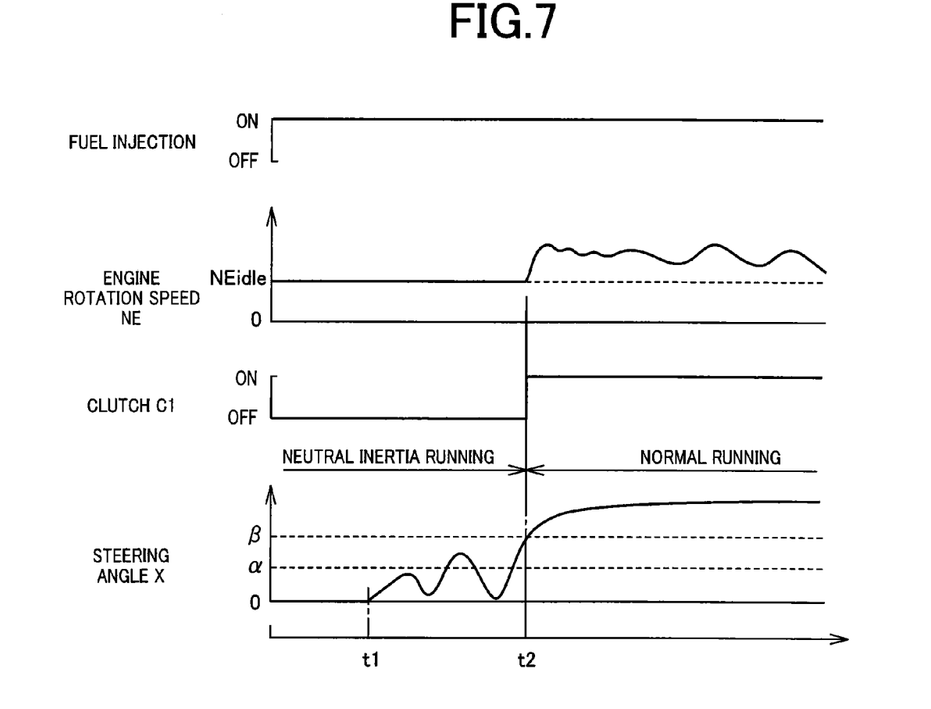
FIG. 7 is an example of a time chart of changes in operation states of the portions when the neutral inertia running mode is returned to the normal running mode in accordance with the flowchart of FIG. 5.

FIG. 7 is an example of a time chart of changes in operation states of the portions when steps S8 to S10 are executed after step S3 for returning from the neutral inertia running mode to the normal running mode and the changes may occur in the case of (b) of FIG. 3. Time t1 of FIG. 7 is the time when the operation of the steering wheel 28 is started during execution of the neutral inertia running mode, and time t2 is the time when the steering angle X becomes equal to or greater than the second determination value β and the determination of step S9 becomes YES (affirmative) so that the clutch C1 is engaged for returning to the normal running mode. In this case, the engine 12 is in the idle state and the engine brake running mode is performed with the engine driven to rotate depending on the vehicle speed V and the gear ratio e of the automatic transmission 16.

As described above, the vehicle drive device 10 of this example performs both the free-run inertia running mode and the neutral inertia running mode as the inertia running mode, and the free-run inertia running mode performed with the rotation of the engine 12 stopped is terminated when the steering angle X becomes equal to or greater than the relatively small first determination value α for returning to the normal running mode. Since electricity cannot be generated by the alternator 22 in the free-run inertia running mode, the electric storage remaining amount SOC of the battery 24 is reduced in association with the operation of the electric power steering system 26 when a driver performs a steering operation; however, the free-run inertia running mode is terminated at a relatively small steering angle X (=the first determination value α) and, therefore, a reduction amount of the electric storage remaining amount SOC is made small, which suppresses the degradation of the battery 24 due to a change in the electric storage remaining amount SOC. Since the free-run inertia running mode is performed and the rotation of the engine 12 is stopped until the steering angle X reaches the first determination value α, an excellent fuel consumption improving performance is acquired.

On the other hand, since the neutral inertia running mode performed with the engine 12 kept rotating is performed until the steering angle X reaches the relatively large second determination value β and the battery 24 is charged by electricity generated by the alternator 22 in the neutral inertia running mode, a small reduction in the electric storage remaining amount SOC of the battery 24 is associated with the operation of the electric power steering system 26 and the battery performance is favorably maintained.

Since the neutral inertia running mode is performed until the steering angle X reaches the relatively large second determination value β, excellent fuel consumption is acquired as compared to the engine brake running mode.

Since a difference is set between the upper limits (determination values α and β) of the steering angle X for terminating the free-run inertia running mode and the neutral inertia running mode based on whether the battery 24 can be charged in consideration of the power consumption due to the operation of the electric power steering system 26, the fuel consumption can further be improved by expanding the range of the steering angle X for performing the inertia running mode while suppressing the degradation of the battery 24 regardless of the power consumption due to the operation of the electric power steering system 26 as compared to the case of uniformly terminating these types of the inertia running modes at a constant steering angle X.

The first determination value α is variably set depending on the electric storage remaining amount SOC as depicted in FIG. 4 and is set to a relatively small value in the case of a small electric storage remaining amount SOC as compared to the case of a large electric storage remaining amount SOC. Therefore, if the electric storage remaining amount SOC is small, the free-run inertia running mode is terminated at a relatively small steering angle X and the electric generation by the alternator 22 is restarted early to charge the battery 24. As a result, even when the electric storage remaining amount SOC of the battery 24 is small, the degradation of the battery 24 due to reduction in the electric storage remaining amount SOC can be suppressed while enjoying the fuel consumption improving performance from the execution of the free-run inertia running mode.

Another example of the present invention will be described.

Figure 8:
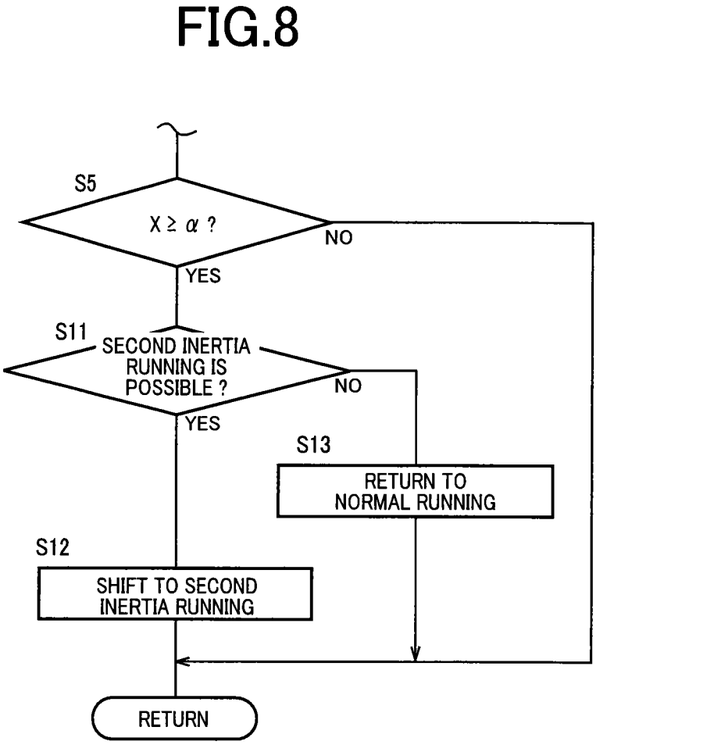
FIG. 8 is a diagram for explaining another example of the present invention and a flow chart for explaining another example of operations from step S5 of FIG. 5.

Although steps S6 and S7 are uniformly executed for returning to the normal running mode if the determination of step S5 is YES in the flowchart of FIG. 5 in the example, a configuration as depicted in FIG. 8 is also available, for example. In particular, when the determination of step S5 is YES, it is determined at step S11 whether the second inertia running mode (the neutral inertia ruining mode) is performable in accordance with the execution condition and, if performable, a shift to the second inertia running mode is made at step S12. Specifically, the fuel supply is resumed to restart the engine 12 for operation in the idle state. If the second inertia running mode is not performable, step S11 is followed by step S13 to restart the engine 12 and engage the clutch C1 for returning to the normal running mode.

Figure 9:
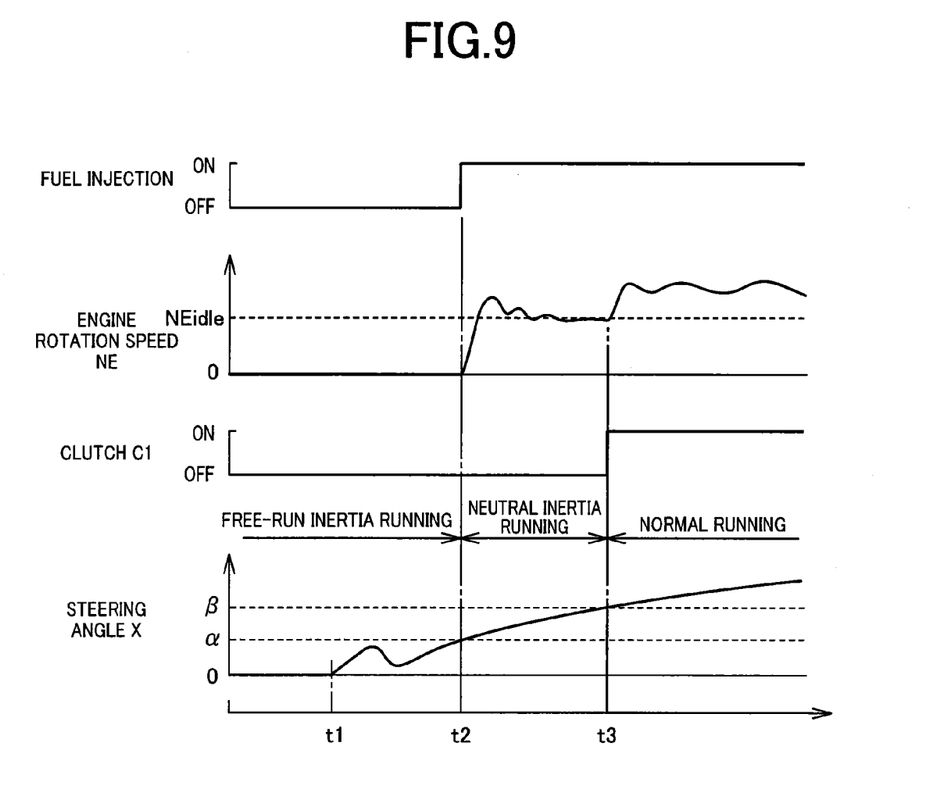
FIG. 9 is an example of a time chart of changes in operation states of the portions when the free-run inertia running mode is switched to the neutral inertia running mode and the neutral inertia running mode is further returned to the normal running mode in accordance with the flowchart of FIG. 8.

FIG. 9 is an example of a time chart of changes in operation states of the portions when the free-run inertia running mode is switched to the neutral inertia running mode in accordance with the flowchart of FIG. 8 and the neutral inertia running mode is further switched to the normal running mode in accordance with the flowchart of FIG. 5. Time t1 of FIG. 9 is the time when the operation of the steering wheel 28 is started during execution of the free-run inertia running mode, and time t2 is the time when the steering angle X becomes equal to or greater than the first determination value α and the determination of step S5 becomes YES (affirmative) so that step S11 is followed by step S12 to restart the engine 12 for switching to the neutral inertia ruing. Subsequently, the signal process is executed in accordance with the flowchart of FIG. 5 and, when the steering angle X becomes equal to or greater than the second determination value β (time t3), the determination of step S9 becomes YES (affirmative) and the clutch C1 is engaged at step S10 for returning to the normal running mode.

Also in this example, the same effect as the example is acquired. Additionally, since a shift to the neutral inertia running mode is made under a certain condition when the steering angle X becomes equal to or greater than the first determination value α during the free-run inertia running mode and a return to the normal running mode is made when the steering angle X becomes equal to or greater than the second determination value β during the neutral inertia running mode, the battery 24 is charged by the electric generation of the alternator 22 associated with the rotation of the engine 12 when the steering angle X is equal to or greater than the first determination value α. Therefore, the degradation of the battery 24 due to reduction in the electric storage remaining amount SOC is suppressed regardless of the power consumption associated with the operation of the electric power steering system 26 and the fuel consumption is improved by performing the inertia ruing until the steering angle X becomes equal to or greater than the second determination value β.

Figure 10:
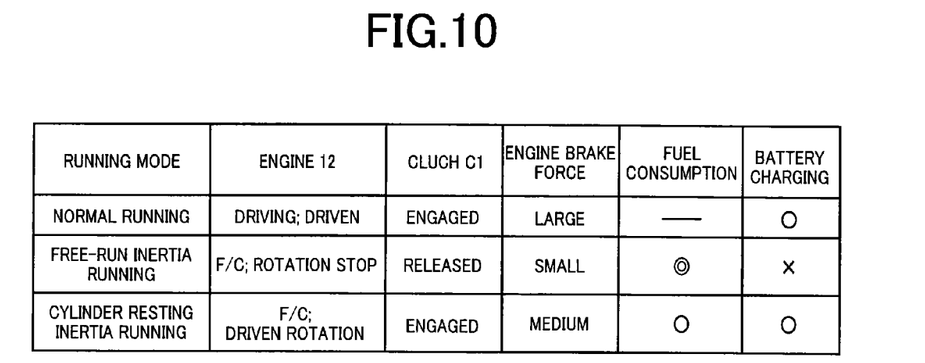
FIG. 10 is a diagram for explaining yet another example of the present invention and a diagram for explaining three kinds of running modes performed by the vehicle drive device of FIG. 1.

On the other hand, although the neutral inertia running mode is performed as the second inertia running mode in the example, the cylinder resting inertia running mode may be performed instead of the neutral inertia running mode as depicted in FIG. 10. In particular, a cylinder resting inertia running means is disposed instead of the neutral inertia running means 56 to perform the cylinder resting inertia running mode. In the cylinder resting inertia running mode, the fuel supply to the engine 12 is stopped (a fuel cut F/C is performed) while the engagement state of the clutch C1 is maintained with the engine 12 and the wheels 20 coupled, and the cylinder resting device of the engine control device 30 stops the intake/exhaust valves in all of multiple cylinders all at the positions where the valves are in the closed valve state.

Although the engine brake force is lager as compared to the neutral inertia running mode and the running distance of the inertia running mode becomes relatively short in the cylinder resting inertia running mode due to the driven rotation of the crankshaft of the engine 12, the engine 12 is subjected to the fuel cut and, therefore, the efficiency of fuel consumption is acquired on the same level with, or equal to or greater than, the neutral inertia running mode. Since the crankshaft of the engine 12 is driven to rotate depending on the vehicle speed V, the battery 24 can be charged by the electric generation by the alternator 22 as is the case with the neutral inertia running mode. As a result, even when the cylinder resting inertia running mode is performed instead of the neutral inertia running mode in the example, the same effect as the example is acquired. In this case, when a shift is made from the free-run inertia running mode to the cylinder resting inertia running mode, the clutch C1 may be engaged for the driven rotation of the engine 12 and the intake/exhaust valves may be stopped at the closed valve positions by the cylinder resting device. At the time of return from the cylinder resting inertia running mode to the normal running mode, the intake/exhaust valves stopped by the cylinder resting device may be released so that the intake/exhaust valves are coupled to the crankshaft and driven to open and close.

The execution condition for performing the cylinder resting inertia running mode and the second determination value β of the steering angle X for terminating the execution of the cylinder resting inertia running mode may be the same as the example, or may be set to different values. The neutral inertia running mode and the cylinder resting inertia running mode may be performed as the second inertia running mode in the individual cases.

Although the examples of the present invention have been described in detail with reference to the drawings, these examples are merely an embodiment and the present invention can be implemented in variously modified and improved forms based on the knowledge of those skilled in the art.

NOMENCLATURE OF ELEMENTS

10: vehicle drive device 12: engine 20: wheels 22: alternator 24: battery 26: electric power steering system 28: steering wheel 30: engine control device 50: electronic control device 52: normal running means 54: free-run inertia running means (first inertia running mode) 56: neutral inertia running means (second inertia running mode) 58: running mode switching control means 66: steering angle sensor X: steering angle α: first determination value β: second determination value

The invention claimed is:

1. A running control device of a vehicle having an engine, an alternator generating electricity from rotation of the engine, a battery storing electric power generated by the alternator, a steering wheel operated by a driver, and an electric power steering system assisting a steering operation of the driver by using electric power of the battery,
the running control device of a vehicle being configured to execute an engine coupling running mode enabling an engine brake running mode performed by coupling the engine and wheels with an engine brake applied by driven rotation of the engine, and an inertia running mode performed with an engine brake force made lower than that of the engine brake running mode, the running control device of a vehicle including a steering angle of the steering wheel as a condition of terminating the inertia running mode,
the running control device of a vehicle performing a first inertia running mode performed with the rotation of the engine stopped and a second inertia running mode performed with the engine kept rotating as the inertia running mode in accordance with predefined respective execution conditions,
the first inertia running mode being terminated when the steering angle becomes equal to or greater than a predefined first determination value while the first inertia running mode is performed,
the second inertia running mode being terminated when the steering angle becomes equal to or greater than a predefined second determination value larger than the first determination value while the second inertia running mode is performed.

2. The running control device of a vehicle of claim 1, wherein
if the steering angle becomes equal to or greater than the first determination value while the first inertia running mode is performed, a shift to the second inertia running mode is made, and wherein
if the steering angle becomes equal to or greater than the second determination value while the second inertia running mode is performed, a return to the engine coupling running mode is made.

3. The running control device of a vehicle of claim 1, wherein
if the steering angle becomes equal to or greater than the first determination value while the first inertia running mode is performed, a return to the engine coupling running mode is made.

4. The running control device of a vehicle of claim 1, wherein the first inertia running mode is a free-run inertia running mode in which the engine is separated from the wheels with fuel supply to the engine stopped to stop rotation, and wherein the second inertia running mode is a neutral inertia running mode in which fuel is supplied to allow the engine to operate while the engine is separated from the wheels.

5. The running control device of a vehicle of claim 1, wherein the first inertia running mode is a free-run inertia running mode in which the engine is separated from the wheels with fuel supply to the engine stopped to stop rotation, and wherein the second inertia running mode is a cylinder resting inertia running mode in which fuel supply to the engine is stopped with the engine kept coupled to the wheels while operation of at least one of a piston and intake/exhaust valves is stopped in some or all of multiple cylinders of the engine.

* * * * *